United States Patent
Danilak

(10) Patent No.: US 7,600,058 B1
(45) Date of Patent: Oct. 6, 2009

(54) BYPASS METHOD FOR EFFICIENT DMA DISK I/O

(75) Inventor: Radoslav Danilak, Santa Clara, CA (US)

(73) Assignee: NVIDIA Corporation, Santa Clara, CA (US)

( * ) Notice: Subject to any disclaimer, the term of this patent is extended or adjusted under 35 U.S.C. 154(b) by 90 days.

(21) Appl. No.: 10/725,980

(22) Filed: Dec. 1, 2003

Related U.S. Application Data

(60) Provisional application No. 60/483,401, filed on Jun. 26, 2003.

(51) Int. Cl.
*G06F 13/00* (2006.01)
(52) U.S. Cl. .................................. 710/33; 713/1; 713/2
(58) Field of Classification Search ...................... 710/5, 710/22–24, 26, 33, 306, 308, 10; 711/100; 713/1–2
See application file for complete search history.

(56) References Cited

U.S. PATENT DOCUMENTS

| | | | |
|---|---|---|---|
| 5,455,913 A | 10/1995 | Shrock et al. | |
| 5,649,230 A | 7/1997 | Lentz | |
| 5,717,954 A | 2/1998 | Grieff et al. | |
| 5,822,568 A | 10/1998 | Swanstrom | |
| 5,864,876 A | 1/1999 | Rossum et al. | |
| 5,940,866 A | 8/1999 | Chisholm et al. | |
| 5,968,143 A * | 10/1999 | Chisholm et al. ............. | 710/23 |
| 6,029,223 A | 2/2000 | Klein | |
| 6,085,278 A | 7/2000 | Gates et al. | |
| 6,098,114 A | 8/2000 | McDonald et al. | |
| 6,185,634 B1 * | 2/2001 | Wilcox ......................... | 710/26 |
| 6,226,695 B1 | 5/2001 | Kaiser et al. | |
| 6,298,407 B1 | 10/2001 | Davis et al. | |
| 6,442,634 B2 | 8/2002 | Bronson et al. | |
| 6,560,657 B1 | 5/2003 | Gandhi et al. | |
| 6,631,434 B1 | 10/2003 | Johnson et al. | |
| 6,681,281 B1 * | 1/2004 | Maleck ....................... | 710/261 |
| 6,745,258 B1 * | 6/2004 | Pellegrino et al. ............. | 710/33 |
| 6,751,038 B1 | 6/2004 | Wada | |
| 6,754,755 B1 | 6/2004 | Johnson et al. | |
| 6,801,963 B2 | 10/2004 | Bissessur et al. | |
| 6,842,803 B2 * | 1/2005 | Schmidt et al. ............... | 710/69 |
| 6,877,048 B2 | 4/2005 | Bilak et al. | |
| 6,901,467 B2 | 5/2005 | Shah et al. | |
| 6,904,473 B1 | 6/2005 | Bloxham et al. | |
| 6,907,480 B2 | 6/2005 | Takei et al. | |
| 6,915,363 B2 * | 7/2005 | Wood et al. ................... | 710/74 |
| 7,389,466 B1 | 6/2008 | Harmer et al. | |
| 2004/0024947 A1 | 2/2004 | Barth et al. | |
| 2004/0024948 A1 | 2/2004 | Winkler | |

OTHER PUBLICATIONS

Brandt, Scott, "Module 2: Computer-System Structure", Spring 2001, http://www.soe.ucsc.edu/-sbrandt/courses/spring01/111/slides/mod2.1.pdf.

* cited by examiner

*Primary Examiner*—Alford W Kindred
*Assistant Examiner*—Chun-Kuan Lee

(57) ABSTRACT

A bypass method for disk I/O (input output) in a computer system. The method includes transferring a command to a disk controller, wherein the command causes a start up of a disk drive coupled to the disk controller. Disk transaction information is then prepared by packaging a plurality of data structures comprising the disk transaction. The disk transaction information is transferred to the disk controller. The disk controller processes the disk transaction information to control the disk drive and implement a disk I/O.

23 Claims, 4 Drawing Sheets

BYPASS METHOD FOR EFFICIENT DMA DISK I/O

This application claims the benefit of commonly assigned U.S. Provisional Application "EFFICIENT I/O USING NDMA (ADMA)", Ser. No. 60/483,401, filed on Jun. 26, 2003, and which is incorporated herein in its entirety.

This application is related to following commonly assigned U.S. Patent Applications:

"A HARDWARE SUPPORT SYSTEM FOR ACCELERATED DISK I/O", by Danilak et al., Ser. No. 10/725,663, filed on Dec. 1, 2003, which is incorporated herein in its entirety;

"A METHOD AND SYSTEM FOR DYNAMIC BUFFERING OF DISK I/O COMMAND CHAINS", by Danilak et al., Ser. No. 10/726,151, filed on Dec. 1, 2003, which is incorporated herein in its entirety;

"A NOTIFIER METHOD FOR HANDLING DISK I/O COMMAND COMPLETION", by Danilak, R., Ser. No. 10/726,092, filed on Dec. 1, 2003, which is incorporated herein in its entirety; and "A METHOD AND SYSTEM FOR DYNAMIC APPENDING OF DISK I/O COMMAND CHAINS", by Danilak, R., Ser. No. 10/726,049, filed on Dec. 1, 2003, which is incorporated herein in its entirety.

FIELD OF THE INVENTION

The field of the present invention relates to digital computer systems. More particularly, the present invention relates computer system IO methods.

BACKGROUND OF THE INVENTION

A primary factor in the utility of a computer system is its speed in executing application programs. A high-performance computer system is expected to be responsive to user inputs and to accurately provide processed results within real-time constraints. A primary factor in the speed and responsiveness of a computer system is the efficiency of its processor subsystem, memory subsystem, IO (input output) subsystem, and the like. Large investments have been made in the development of very high-speed processors and high-speed memory subsystems. Consequently, the computer industry has seen remarkable annual improvements in computer system performance. A comparatively new area of focus for improving computer system performance is the input output mechanisms involved in accessing and storing data.

Data is typically stored on attached hard disk drives. Disk drives having size of 200 GB or more are increasingly common in desktop and laptop computer systems. Fast and efficient access to data stored on such drives is important to responsiveness and functionality of typical user applications.

ATA (AT Attachment) is a widely supported specification that defines methods of accessing data on disks. The ATA specification evolved from the earlier IDE (integrated drive electronics) specification. ATA defines a type of hardware interface that is widely used to connect data storage peripheral devices such as hard disk drives, CD-ROMs, tape drives, and the like, to a computer system. The ATA standard has further evolved to accommodate additional device types and data transfer features. For example, ATAPI (ATA Packet Interface) defines a version of the ATA standard for CD-ROMs and tape drives, ATA-2 (Fast ATA) defines the faster transfer rates used in Enhanced IDE (EIDE), and ATA-3 adds interface improvements, including the ability to report potential problems.

ATA devices have shown dramatic increases in data transfer speed and storage capacity over time. However, computer systems using such faster devices have not fully shown the expected performance improvements. A number of interface problems with computer system I/O components are partially responsible for the performance limitations, such as, for example, the data transfer characteristics of the PCI bus (e.g., due to the need to retain host adapter PCI compatibility), the interrupt based data transfer mechanisms, and the like.

The ADMA (Automatic DMA) specification comprises a new specification designed to improve the performance of ATA type devices. ADMA is designed to add features that improve the data transfer speed and efficiency of ATA devices. For example, ADMA adds support for multi-threading applications, command chaining techniques, command queuing, and the like, which are intended to have the overall effect of decoupling the host command sequence from the channel execution. The objective of the ADMA standard is to dramatically increase the performance of computer systems that operate with ATA type devices.

Problems exist, however, with respect to how ADMA implements disk transactions with a disk controller. As described above, one objective of ADMA is to improve the data transfer speed and efficiency of ATA devices. Accordingly, the ADMA specification defined an improved method of implementing read transactions and write transactions with an ATA hard disk, in comparison to the conventional ATA defined transactions. For example, conventional ATA defined a disk I/O requiring a series of write transactions to a set of 8-bit registers within a disk controller. In the earlier ATA specification, read/write transactions required a series of 8-bit reads/writes to these IO mapped registers, causing the computer system to incur a significant latency and overhead burden.

The ADMA specification included a number of improvements over the earlier ATA disk transactions. One improvement involved the use of system memory to build a disk transaction as opposed to the set of 8-bit registers in the disk controller. Another improvement involved the use of a DMA transfer from the system memory to the disk controller to implement the disk transaction. For example, ADMA defined disk transactions as beginning with the preparation of a disk transaction by the processor (e.g., a driver executing on the CPU). This preparation includes generating and arranging the transaction information, including the PRDs (physical region descriptors) and CPBs (command parameter blocks) for the transaction. The transaction information is then loaded into system memory (e.g., at a particular address). The processor then pushes a pointer to the system memory location (e.g., for the disk transaction information) to the disk controller. The disk controller then uses the pointer to access system memory and retrieve the disk transaction information. Once the disk controller has the necessary transaction information, the disk controller issues commands to start up the disk drive mechanism and implement the disk transaction.

Problems remain, however, with respect to excessive amounts of latency and overhead within the ADMA disk transaction methodology. For example, one problem is due to the fact that the transfer of transaction information from the processor to system memory and then to the disk controller involves a number of arbitration and transfer operations on the buses linking the processor, system memory, and disk controller. These bus transactions can each incur two to four microseconds of latency. Another problem is due to the fact that the disk controller does not start the disk drive mechanism to begin transaction until it has received the transaction information (e.g. via DMA transfer) from system memory.

Thus, the overall transaction must suffer through the latency involved in the start up of the disk drive mechanism, which can be another two to four microseconds.

The latency and excessive overhead problems of ADMA disk transaction methodology can significantly detract from overall computer system performance. As processor and system memory performance continue to show annual improvement, it becomes increasingly important that disk I/O systems show similar improvements. As latency penalties are reduced in other components of a computer system (e.g., data transfer buses, graphics operations, etc.) it becomes increasingly important that the disk I/O system shows similar degrees of improvement with respect to reduced latency, overhead, and the like, in order to avoid imposing performance bottlenecks on the overall computer system.

SUMMARY OF THE INVENTION

Thus, what is required is a solution that can significantly reduce latency experienced by the computer system during disk I/O. The required solution should provide significantly reduce latency, processor overhead, and the like in comparison to the prior art.

In one embodiment, the present invention is implemented as a bypass method for disk I/O (input output) in a computer system. The method includes transferring a command to a disk controller, wherein the command causes a start up of a disk drive coupled to the disk controller. Disk transaction information is then prepared by packaging a plurality of data structures comprising the disk transaction. The disk transaction information can be prepared by using a processor of the computer system. The disk transaction information is transferred to the disk controller. The disk controller processes the disk transaction information to control the disk drive and implement a disk I/O. The disk transaction information can include a plurality of PRD data structures and a plurality of CPB data structures for implementing the disk transaction.

In one embodiment, the processor of the computer system accesses a bus coupled to the disk controller to transfer the disk transaction information from the processor to the disk controller. Access to the bus can be controlled by a bridge component. In one embodiment, the bridge component is coupled to the disk controller and the disk transaction information from the processor is transferred via the bridge component. Alternatively, the disk controller can be directly integrated with the bridge component. In one embodiment, the bridge component is a South bridge of the computer system. In one embodiment, the transferring of the command to the disk controller causing the start up of the disk drive is configured to reduce a start up latency of the disk drive, thereby significantly hiding the amount of time (e.g., four to six microseconds) required to start up the disk drive mechanism.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention.

Embodiments of the present invention comprise a bypass method for implementing disk I/O (input output) in a computer system. Embodiments of the present invention significantly reduce latency experienced by the processor (e.g., CPU) of the computer system while waiting for hard disk data transactions to execute. Additionally, embodiments of the present invention significantly reduce latency, processor overhead, and the like required to implement disk I/O in comparison to the prior art.

Figure 1:
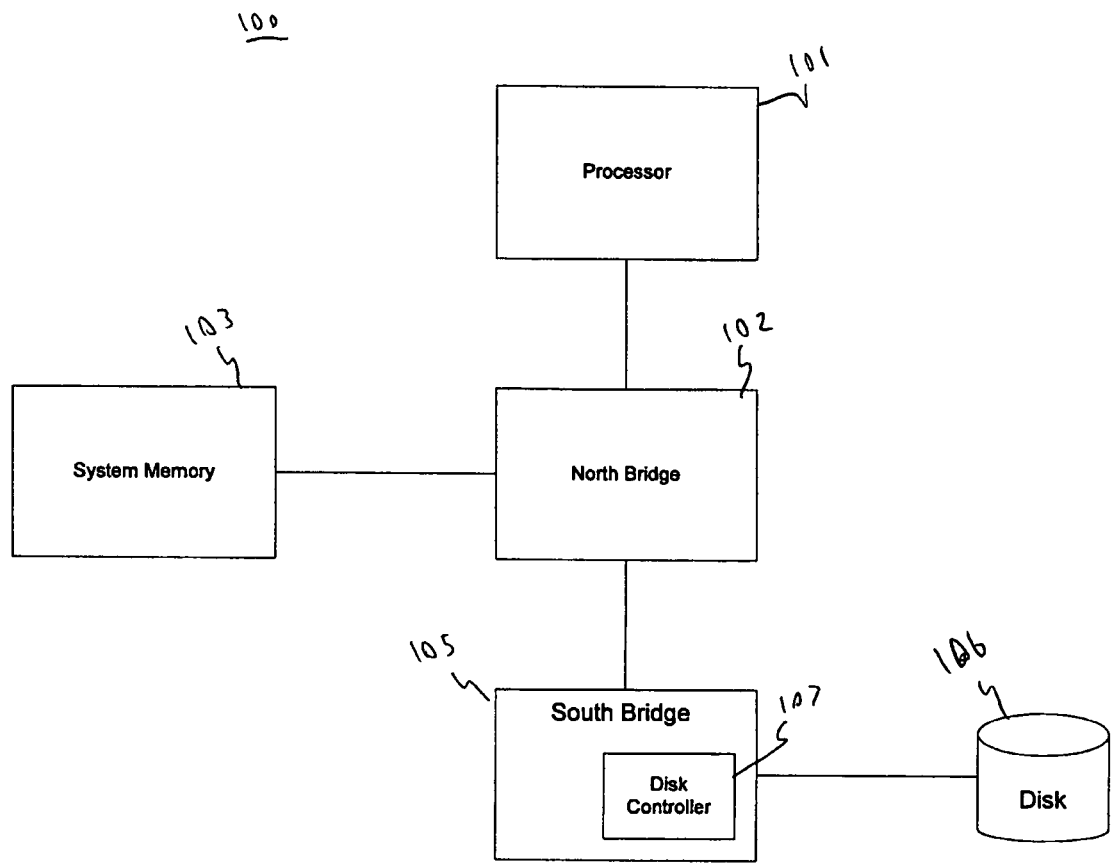
FIG. 1 shows a diagram depicting a computer system showing the basic components of a computer system platform that may be used to implement the functionality of embodiments of the present invention.

FIG. 1 shows a diagram depicting a computer system 100 showing the basic components of a computer system platform that may be used to implement the functionality of an embodiment of the present invention. The system 100 embodiment of FIG. 1 shows a general-purpose processor 101 coupled to system memory 103 via a memory controller 102 (e.g., North bridge). System 100 also shows a South bridge 105 coupled to a disk drive 106. In this embodiment, the South bridge 105 includes a disk controller 107 for controlling the disk drive 106.

Figure 4:
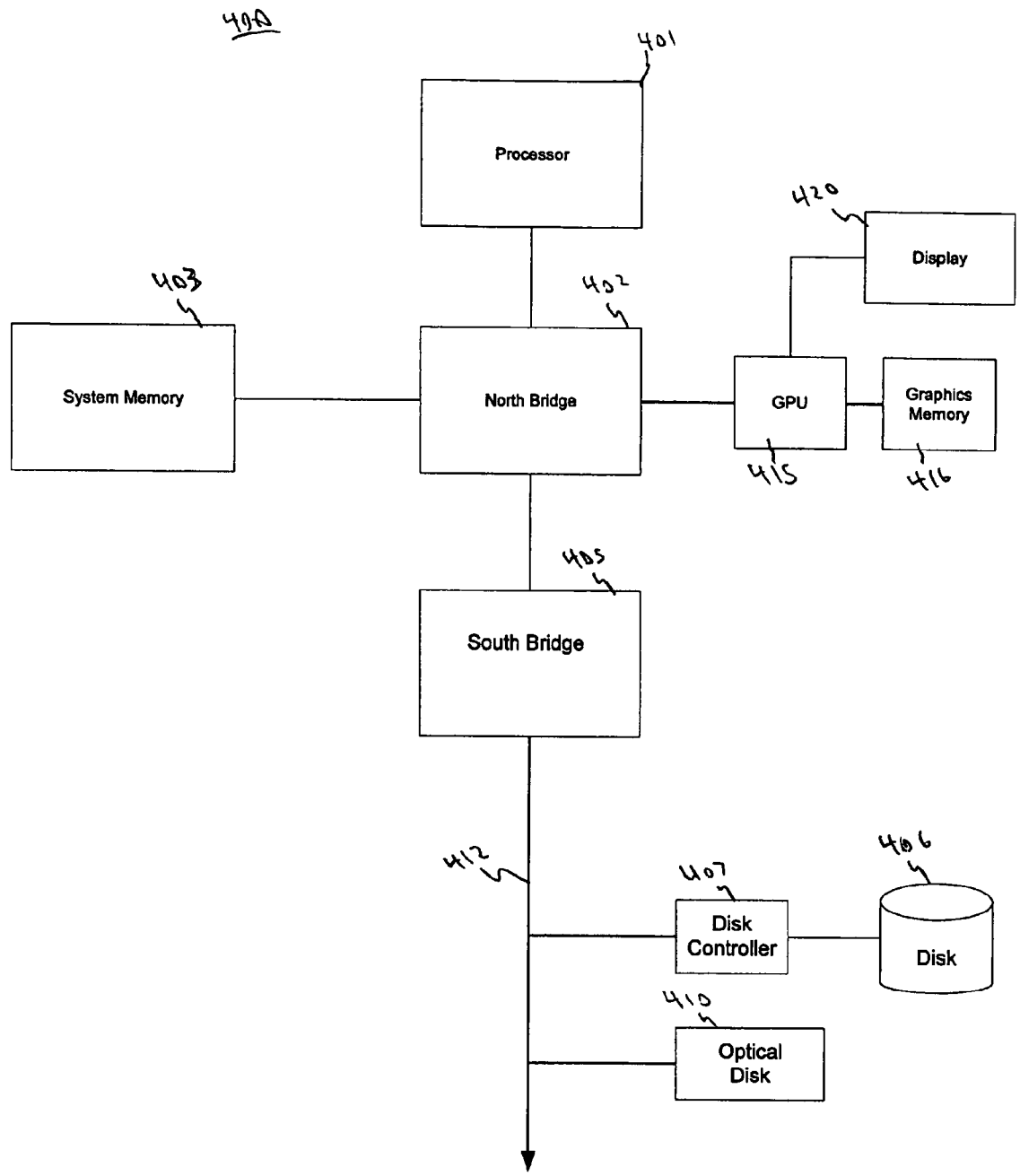
FIG. 4 shows a diagram of a computer system in accordance with an alternative embodiment of the present invention.

It should be noted that the computer system 100 embodiment shows one configuration of a computer system platform that can implement the functionality of the present invention. The specific configuration of a computer system in accordance with the present invention can change in accordance with specific requirements of a given application. For example, components can be included that add specialized peripheral buses (e.g., 1394, USB, etc.), network connectivity (e.g., Ethernet, Bluetooth, etc.), specialized graphics functions and graphics memory (e.g., high-performance graphics processor units, local graphics memory, etc.), IO devices (e.g., keyboards, mice, etc.), and the like. Although the system 100 embodiment shows two bridge components (e.g., North bridge 102 and South bridge 105), system 100 can be implemented with a single bridge component, for example where the North bridge 102 and the South bridge 105 are combined. Similarly, the disk controller 107 can be a discrete component coupled to the South bridge 105 via a bus (e.g., as opposed to being integrated). An example of such an embodiment is shown in FIG. 4 below.

Accordingly, computer system 100 can function as the basic computer system platform for a laptop, desktop, or server computer system, or for a set-top gaming device such as, for example, as an X-Box™ or similar gaming device or console. Additionally, it should be noted that the term CPU is used herein generally, and thus can be implemented as a number of different types of processors for a number of different types of computer system devices, such as, for example, an embedded processor, a graphics processor (e.g., specialized for performing graphics computations), a multi-processor subsystem, and the like.

Referring still to FIG. 1, the system 100 embodiment functions by implementing a bypass method for executing disk I/O (e.g., reading/writing data to the disk drive 106). As used herein, the term bypass refers to the manner in which the present invention bypasses the prior art ATA step of writing to a set of registers (e.g., 8-bit registers, 32 bit-registers, or through the construction of a FIS) in the disk controller to implement a disk transaction. In the system 100 embodiment, a disk transaction begins with the processor 101 issuing a command to start up the disk drive mechanism of the disk drive 106. By issuing the start up command upfront, at the beginning of the disk transaction, system 100 can immediately begin the start up of the disk drive mechanism. As is generally known, the start up delay of the disk drive mechanism can be typically four to six microseconds.

The processor 101 uses the start up delay to build, or prepare, disk transaction information. Once the start up command is issued by the processor 101 to the disk controller 107, the processor 101 uses the start up delay time to prepare the disk transaction information by packaging a plurality of data structures comprising the disk transaction. As known by those skilled in the art, such data structures include, for example, CPBs (command parameter blocks) and PRDs (physical region descriptors) for the data transaction. A CPB is a DMA data structure that describes a command to be executed by the disk I/O engine. A PRD is a DMA data structure that describes areas of host memory (e.g., system memory 103) that are used during data transfer.

The processor 101 subsequently transfers the disk transaction information (e.g., including the PRD data structures and the CPB data structures) to the disk controller 107. In the present system 100 embodiment, this involves the processor 101 communicating with the North bridge 102 and subsequently communicating with the South bridge 105. The disk transaction information is transferred across the buses coupling the processor 101, the North bridge 102, South bridge 105, and the disk controller 107.

The disk controller 107 then implements the disk transaction once it has received the disk transaction information. As described above, the disk drive mechanism of the disk drive 106 was previously started by a command received from the processor 101. By the time the disk transaction information has been received from the processor 101, a significant amount of the start up latency of the disk drive 106 will have occurred. Consequently, the disk transaction can be implemented by the disk controller 107 much sooner in comparison to the prior art.

For example, in the prior art ADMA method, the start up command is not issued to the disk drive 107 until the disk transaction information has been retrieved by the disk controller 107. In contrast, in accordance with embodiments of the present invention, the start up command is issued prior to the packaging of the disk transaction information or the receiving of the disk transaction information by the disk controller 107, thereby hiding a significant amount of the start up latency from the processor 101 and other components of the computer system 100.

Figure 2:
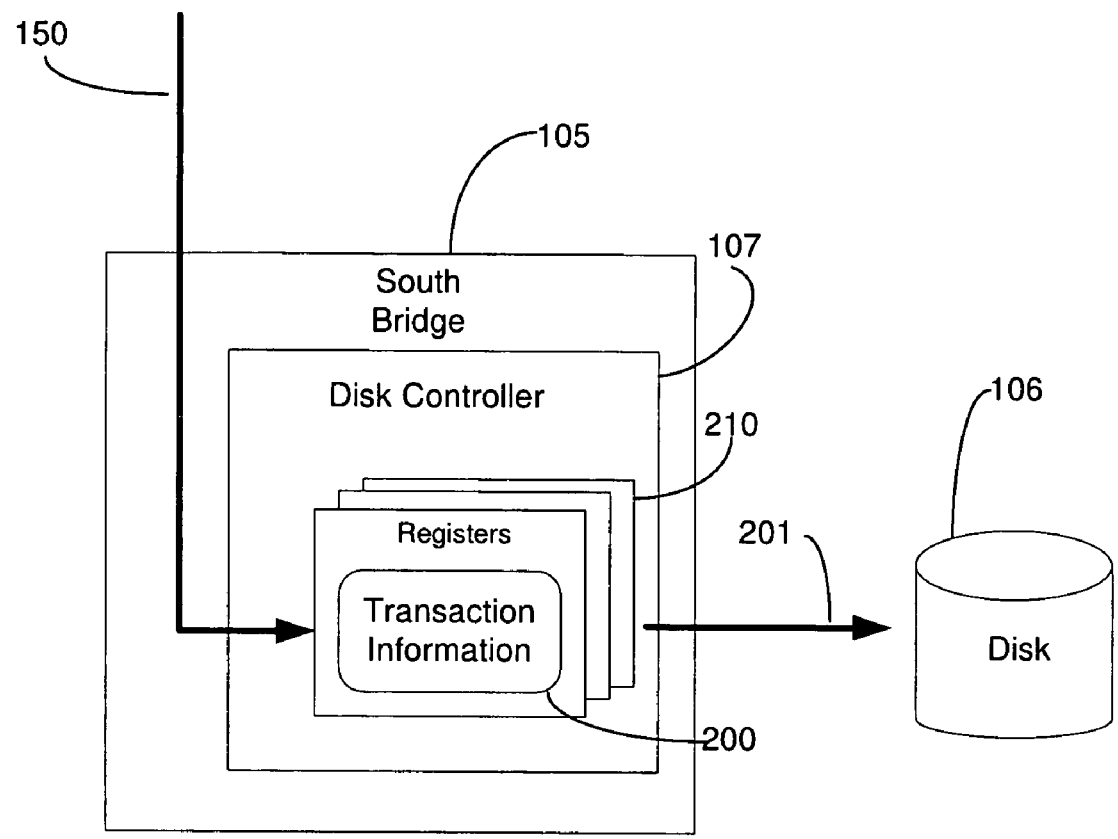
FIG. 2 shows a diagram illustrating the disk controller having the transaction information stored within a set of internal bypass registers in accordance with one embodiment of the present invention.

FIG. 2 shows a diagram illustrating the disk controller 107 having the transaction information 200 stored within an internal memory in accordance with one embodiment of the present invention.

In the disk controller 107 embodiment of FIG. 2, a set of bypass registers 210 comprise the internal memory for storing the transaction information 200. As described above, the disk transaction information 200 is transferred from the processor 101 to the disk controller 107. The disk transaction information 200 is then stored within a set of memory mapped bypass registers 210 of the disk controller 107. In the controller 107 embodiment, these registers are 64 bits long (in comparison to the prior art 8 bit registers) and function by aggregating the transaction information through a memory mapped data transfer from the processor 101. The memory mapped registers provide a much more efficient data transfer in comparison to the prior art (e.g., I/O mapped registers). It should be noted that other bypass register configurations can be used (e.g., 32 bits, 48 bits, 128 bits, etc.).

The disk transaction information 200 is transferred to the disk controller 107 across a bus 150. As described above, in one embodiment, the bus 150 includes the bus linking the North bridge 102 and the South bridge 105 (e.g., as shown in FIG. 1). In the present embodiment, the disk controller 107 is integrated within the South bridge 105.

Once the disk controller 107 has the transaction information 200, the disk controller 107 is in possession of the information it needs to implement the disk transaction. The disk controller 107 then executes the disk transaction with the disk drive 106 via the bus 201.

In the present embodiment, the disk drive 106 is in accordance with a version of the ATA specification. For example, the disk drive 106 can be a Serial ATA (e.g., SATA) disk drive and the bus 201 can be a Serial ATA bus. Alternatively, the disk drive 106 can be an ATA disk drive and the bus 201 can be an ATA 100, ATA 133, etc. bus (e.g., a parallel ATA bus).

Figure 3:
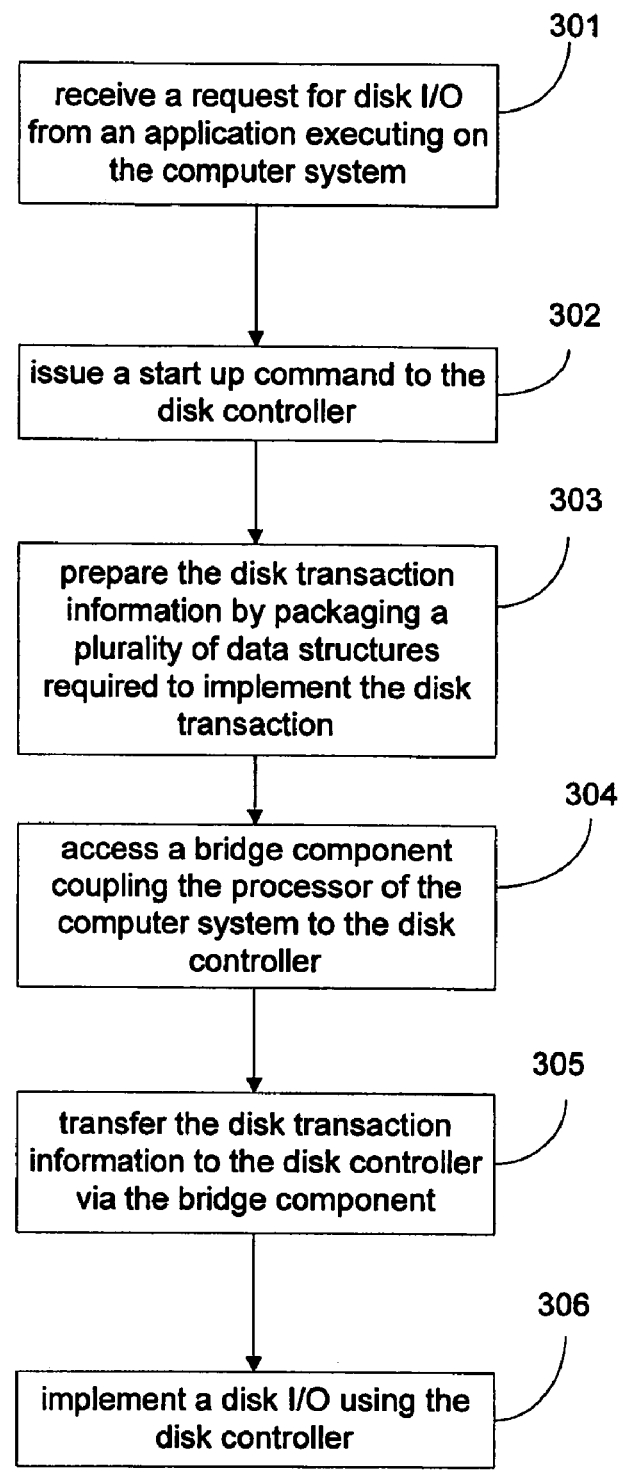
FIG. 3 shows a flowchart of the steps of a disk I/O process in accordance with one embodiment of the present invention.

FIG. 3 shows a flowchart of the steps of a process 300 in accordance with one embodiment of the present invention. Process 300 shows the steps involved in a bypass disk I/O method as implemented by a computer system (e.g., computer system 100 of FIG. 1).

Process 300 begins in step 301, where a request is received for disk I/O from an application executing on the computer system. The application can be, for example, and operating system, a user application executing on top of the operating system, a device driver, or the like. In step 302, upon receiving the request for disk I/O, the CPU (e.g., processor 101) of the computer system issues a start up command to the disk controller (e.g., disk controller 107).

In step 303, the processor then prepares the disk transaction information by packaging a plurality of data structures required to implement the disk transaction. As described above, the start up command is first issued in order to begin the process of starting up the disk drive mechanism. This has the effect of reducing the amount of latency experienced by the processor. As the disk drive mechanism is starting up, the processor prepares the disk transaction information.

In step 304, the processor accesses a bridge component (e.g., South bridge 105) that couples to the disk controller. As described above, this bridge component controls the bus coupling the disk controller to the computer system. Depending upon the configuration of the computer system, the disk controller can be integrated within the bridge component or can be a discrete component coupled to the bridge component via a bus (e.g., PCI bus).

In step 305, the disk transaction information is transferred to the disk controller via the bridge component. As described above, the disk transaction information is stored within internal memory (e.g., memory mapped registers) of the disk controller. Subsequently, in step 306, the disk controller implements the disk I/O.

In this manner, the bypass method embodiments of the present invention provide a number of improvements over the prior art. For example, the start up command immediately begins the start up process of the disk drive mechanism at the beginning of a disk I/O process. This has the effect of significantly hiding the disk drive start up latency. Additionally, the disk transaction information is pushed from the processor to the disk controller. This has the effect of reducing the latency and overhead involved in accessing, arbitrating for control of, and transferring data across the buses coupling the processor to system memory (e.g., system memory 103) and the disk controller. For example, in the prior art (e.g., the ADMA specification), the processor accesses system memory to build transaction information, pushes a pointer to the system memory location to the disk controller, and requires the disk controller to access and retrieve the transaction information from the system memory, thereby requiring a greater number of arbitration and data transfer cycles.

FIG. 4 shows a diagram of a computer system 400 in accordance with an alternative embodiment of the present invention. Computer system 400 is substantially similar to computer system 100 of FIG. 1. Computer system 400 shows a discrete GPU 415 (graphics processor unit) and a discrete disk controller 407. The computer system 400 includes a general-purpose CPU 401 coupled to system memory 403 via a memory controller 402 (e.g., North bridge). In this embodiment, a South bridge 405 is coupled to a discrete disk drive controller 407 and an optical disk 410 (e.g., DVD ROM, CD ROM, etc.) via a bus 412. The disk controller 407 is coupled to a hard disk drive 406. The system 400 embodiment also includes a GPU 415 coupled to drive a display 420. The GPU 415 is coupled to its local graphics memory 416.

As with computer system 100 of FIG. 1, computer system 400 can include additional components in accordance with specific requirements of a given application. Such components include, for example, specialized peripheral buses (e.g., 1394, USB, etc.), network connectivity (e.g., Ethernet, Bluetooth, etc.), and the like.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method for disk I/O (input output) in a computer system, comprising:
   upon receiving a request for said disk I/O from an application executing on the computer system, transferring a command to a disk controller, the command causing a start up of a disk drive coupled to the disk controller;
   subsequent to transferring the command causing the start up and before completion of said start up, preparing disk transaction information by packaging a plurality of data structures comprising a disk transaction in response to said command;
   in response to said preparing said disk transaction information, transferring the disk transaction information to the disk controller; and
   in response to said transferring said disk transaction information to said disk controller, implementing said disk I/O, wherein the disk controller uses the disk transaction information to control the disk drive.

2. The method of claim 1, further comprising:
   preparing the disk transaction information by using a processor of the computer system; and
   transferring the disk transaction information from the processor to the disk controller.

3. The method of claim 2, further comprising:
   accessing a bus coupled to the disk controller to transfer the disk transaction information from the processor to the disk controller.

4. The method of claim 3, further comprising:
   accessing a bridge component controlling the bus coupled to the disk controller and transferring the disk transaction information from the processor to the disk controller via the bridge component.

5. The method of claim 4, wherein the bridge component is a South bridge of the computer system.

6. The method of claim 1, wherein the transferring of the command to the disk controller causing the start up of the disk drive is configured to reduce a start up latency of the disk drive.

7. The method of claim 1, wherein the disk transaction information includes a plurality of PRD (physical region descriptor) data structures and a plurality of CPB (command parameter block) data structures for implementing the disk transaction.

8. The method of claim 1 wherein the disk drive is compatible with a version of the ATA standard.

9. The method as described in claim 1 further comprising:
   aggregating said transaction information via a memory mapped data transfer from said processor of said computer system.

10. The method as described in claim 1, wherein a significant amount of start up latency of the disk drive has elapsed when said disk transaction information is received by said disk controller.

11. A computer readable media having computer readable code which when executed by a processor of a computer system cause the computer system to implement a bypass method for efficient disk I/O (input output), comprising:
    upon receiving a request for said disk I/O from an application executing on the computer system, transferring a command to a disk controller, the command causing a start up of a disk drive coupled to the disk controller;
    subsequent to transferring the command causing the start up and before the completion of said start up, preparing disk transaction information by packaging a plurality of PRD (physical region descriptor) data structures and a plurality of CPB (command parameter block) data structures comprising a disk transaction in response to said command;
    accessing a bridge component controlling a bus coupled to the disk controller;
    in response to said preparing said disk transaction information, transferring the disk transaction information to a plurality of bypass registers of the disk controller via the bridge component; and
    in response to said transferring said disk transaction information to said disk controller, implementing said disk I/O, wherein the disk controller processes the disk transaction information to control the disk drive.

12. The computer readable media of claim 11, wherein the bridge component is a South bridge of the computer system.

13. The computer readable media of claim 12, further comprising:
   accessing a North bridge to transfer the disk transaction information; and
   transferring the disk transaction information from the processor to the disk controller via the North bridge and the South bridge of the computer system.

14. The computer readable media of claim 11, wherein the transferring of the command to the disk controller causing the start up of the disk drive is configured to hide a start up latency of the disk drive.

15. The computer readable media of claim 11 wherein the disk drive is compatible with a version of ATA standard.

16. A computer system for implementing a bypass method for efficient disk I/O (input output), comprising:
   a processor;
   a system memory coupled to the processor;
   a bridge component coupled to the processor; and
   a disk controller coupled to the bridge component, the disk controller including a plurality of bypass registers, wherein the processor executes software code stored in the system memory, the software code causing the computer system to implement a method comprising:
   upon receiving a request for said disk I/O from an application executing on the computer system, transferring a command from the processor to the disk controller, the command causing a start up of a disk drive coupled to the disk controller;
   subsequent to transferring the command causing the start up and before the completion of said start up, preparing disk transaction information by packaging a plurality of data structures comprising a disk transaction in response to said command;
   in response to said preparing said disk transaction information, transferring the disk transaction information to the bypass registers of the disk controller; and
   in response to said transferring said disk transaction information to said disk controller, implementing said disk I/O, wherein the disk controller processes the disk transaction information to control the disk drive.

17. The system of claim 16, further comprising:
   preparing the disk transaction information by using said processor of the computer system; and
   transferring the disk transaction information from the processor to the disk controller.

18. The system of claim 16, wherein the disk controller is integrated within the bridge component.

19. The system of claim 16, wherein the bridge component is a South bridge of the computer system.

20. The system of claim 16, wherein the transferring of the command to the disk controller causing the start up of the disk drive is configured to reduce a start up latency of the disk drive.

21. The system of claim 16, wherein the disk transaction information includes a plurality of PRD (physical region descriptor) data structures and a plurality of CPB (command parameter block) data structures for implementing the disk transaction.

22. The system of claim 16 wherein the disk drive is compatible with a version of ATA standard.

23. The system as described in claim 22, wherein said plurality of bypass registers is operable to allow said disk controller to implement said disk transaction without writing to a register of said ATA standard.

* * * * *